United States Patent
Dobson et al.

(10) Patent No.: US 7,244,085 B2
(45) Date of Patent: Jul. 17, 2007

(54) FASTENER ASSEMBLY

(75) Inventors: Kenneth S. Dobson, Chicago, IL (US); Robert K. Dutzi, Palatine, IL (US); Jason K. Trotter, Des Plaines, IL (US)

(73) Assignee: Illinois Tool Works, Inc, Glenview, IL (US)

( * ) Notice: Subject to any disclaimer, the term of this patent is extended or adjusted under 35 U.S.C. 154(b) by 156 days.

(21) Appl. No.: 11/039,002

(22) Filed: Jan. 18, 2005

(65) Prior Publication Data

US 2005/0241103 A1 Nov. 3, 2005

Related U.S. Application Data

(60) Provisional application No. 60/566,206, filed on Apr. 26, 2004.

(51) Int. Cl.
*H02G 3/22* (2006.01)
*F16B 37/14* (2006.01)

(52) U.S. Cl. ............... 411/431; 411/533; 411/353; 411/546; 411/999; 16/2.1

(58) Field of Classification Search ............... 411/436, 411/353, 533, 541, 544, 546, 999, 369, 371.1; 16/2.1
See application file for complete search history.

(56) References Cited

U.S. PATENT DOCUMENTS

| | | | | |
|---|---|---|---|---|
| 2,188,596 A * | 1/1940 | Hobert | ............ | 16/2.1 |
| 2,311,427 A * | 2/1943 | Winkelmeyer | ............ | 16/108 |
| 2,853,112 A * | 9/1958 | Poupitch | ............ | 411/105 |
| 3,030,997 A * | 4/1962 | Collins | ............ | 411/301 |
| 3,687,404 A * | 8/1972 | Werner | ............ | 248/544 |
| 3,762,747 A * | 10/1973 | Griffen | ............ | 403/225 |
| 3,964,364 A * | 6/1976 | Poe | ............ | 411/43 |
| 4,300,859 A * | 11/1981 | Donan, Jr. | ............ | 405/259.3 |
| 4,363,580 A * | 12/1982 | Bell | ............ | 411/15 |
| 4,397,061 A * | 8/1983 | Kanzaka | ............ | 16/2.1 |
| 4,579,492 A * | 4/1986 | Kazino et al. | ............ | 411/80.1 |
| 4,675,937 A * | 6/1987 | Mitomi | ............ | 16/2.1 |
| 4,973,102 A * | 11/1990 | Bien | ............ | 296/187.01 |
| 4,978,264 A * | 12/1990 | Philippe | ............ | 411/26 |
| 5,020,951 A * | 6/1991 | Smith | ............ | 411/107 |
| 5,094,579 A * | 3/1992 | Johnson | ............ | 411/107 |
| 5,222,852 A * | 6/1993 | Snyder | ............ | 411/553 |
| 5,255,647 A * | 10/1993 | Kiczek | ............ | 123/195 C |
| 5,435,679 A * | 7/1995 | Barry | ............ | 411/339 |
| 5,462,395 A * | 10/1995 | Damm et al. | ............ | 411/107 |
| 5,526,549 A * | 6/1996 | Mori et al. | ............ | 16/2.1 |
| 5,551,722 A * | 9/1996 | Schwartz et al. | ............ | 280/124.152 |
| 5,688,093 A * | 11/1997 | Bowers | ............ | 411/552 |
| 5,701,634 A * | 12/1997 | Uemura et al. | ............ | 16/2.1 |
| 5,704,631 A * | 1/1998 | Sparks et al. | ............ | 280/124.101 |
| 5,739,475 A * | 4/1998 | Fujisawa et al. | ............ | 174/153 G |
| 5,856,635 A * | 1/1999 | Fujisawa et al. | ............ | 174/153 G |
| 5,950,381 A * | 9/1999 | Stansbie | ............ | 52/220.8 |
| 6,058,562 A * | 5/2000 | Satou et al. | ............ | 16/2.1 |
| 6,059,503 A * | 5/2000 | Johnson | ............ | 411/353 |

(Continued)

*Primary Examiner*—Katherine Mitchell
(74) *Attorney, Agent, or Firm*—Mark W. Croll; Paul F. Donovan

(57) ABSTRACT

A fastener assembly includes a grommet having an enlarged bulbous body and a cylindrical extension projecting therefrom, the projection and body defining axially aligned openings therethrough. The cylindrical projection is configured to retain a washer on the outside thereof and a fastener on the inside thereof.

15 Claims, 3 Drawing Sheets

U.S. PATENT DOCUMENTS

| | | | |
|---|---|---|---|
| 6,088,874 A * | 7/2000 | Nakata et al. | 16/2.1 |
| 6,088,876 A * | 7/2000 | Daoud | 16/2.2 |
| 6,101,674 A * | 8/2000 | Furuya et al. | 16/2.1 |
| 6,211,464 B1 * | 4/2001 | Mochizuki et al. | 174/659 |
| 6,213,885 B1 * | 4/2001 | Bachle | 470/19 |
| 6,240,597 B1 * | 6/2001 | Mochizuki | 16/2.1 |
| 6,402,171 B1 * | 6/2002 | Nickerson et al. | 280/124.106 |
| 6,431,585 B1 * | 8/2002 | Rickabus et al. | 280/728.3 |
| 6,572,127 B2 * | 6/2003 | Pazdirek | 280/124.152 |
| 6,616,390 B1 * | 9/2003 | Feilner | 411/104 |
| 6,789,993 B2 * | 9/2004 | Ozawa et al. | 411/546 |
| 6,897,380 B2 * | 5/2005 | Sakata et al. | 174/650 |
| RE38,788 E * | 9/2005 | Satou et al. | 16/2.1 |
| 2001/0026746 A1 * | 10/2001 | Calandra et al. | 411/436 |
| 2001/0049857 A1 * | 12/2001 | Uchida et al. | 16/2.1 |
| 2002/0150445 A1 * | 10/2002 | Ozawa et al. | 411/546 |
| 2005/0115019 A1 * | 6/2005 | Sanroma et al. | 16/2.1 |
| 2005/0241103 A1 * | 11/2005 | Dobson et al. | 16/2.1 |
| 2006/0029486 A1 * | 2/2006 | Fonville | 411/352 |
| 2006/0226622 A1 * | 10/2006 | Trotter | 280/124.107 |

* cited by examiner

FASTENER ASSEMBLY

CROSS-REFERENCE TO RELATED APPLICATIONS

The present regular United States patent application claims the benefits of U.S. Provisional Application Ser. No. 60/566,206 filed Apr. 26, 2004.

FIELD OF THE INVENTION

The present invention relates generally to grommets and, more particularly to grommets configured for assembly with fasteners and washers that are used in conjunction with the grommet.

BACKGROUND OF THE INVENTION

Grommets are used extensively in a variety of applications and assemblies, including many different assemblies and subassemblies in motor vehicles. In motor vehicles, grommets are used frequently in stabilizer links, control arms, shock mounts and various other suspension applications and mounting assemblies. Often a grommet is installed onto a threaded component of the vehicle together with a washer and/or fastener such as a nut. Properly placing two or three components can be difficult and time-consuming, particularly if placement is at a difficult angle or orientation. Efficient assembly line installation, such as used for automobiles and other high volume products, is dependent upon rapid, error free performance of each assembly step. Therefore, there has been a desire to make the installation of grommets easier and more efficient, which has resulted in attempts to pre-assemble or in some way unitize the grommet with other associated components of the assemblies.

A variety of different grommet designs are known that can retain a washer and/or a nut or other fastener that will be used in cooperation with the grommet. For example, it is known to use shrink-wrap to capture a grommet and mating part together, to facilitate subsequent installation of both parts. As another example, it is known to use adhesives to secure a grommet to an associated member. Yet another known example involves insert molding the grommet to the cooperating structure. Although each of these prior designs has proven satisfactory in some applications, there is a continuing need for improved grommet designs that are inexpensive to manufacture, that are easy to assembly and install and that are adapted and configured to be durable and dependable in use.

SUMMARY OF THE INVENTION

The present invention provides a grommet having a body and a cylindrical extension projecting therefrom, with axially aligned openings therethrough. The outside of the cylindrical extension is configured to retain a washer and the inside of the cylindrical extension is configured to retain a fastener, such as a nut.

In one aspect thereof, the present invention provides a grommet with a grommet body, a cylindrical extension projecting from the grommet body and an opening extending through the body and the extension. An outward projection on the extension in spaced relation with the body defines with the body a washer retention zone between the body and the projection.

In another aspect thereof, the present invention provides a fastener assembly with a grommet having a body and a cylindrical extension defining an axial opening therethrough. A washer is disposed on the extension; and a fastener is held at least partly within the cylindrical extension.

In a further aspect thereof, the present invention provides a grommet with a bulbous body and a cylindrical extension having axially aligned openings therethrough. An outwardly projecting rib on the cylindrical extension is in spaced relation with the bulbous body, and an internal projection is provided within the opening in the cylindrical extension near an end of the cylindrical extension opposite the bulbous body.

An advantage of the present invention is providing a grommet that can be pre-assembled with a washer and/or fastener such as a nut or a bolt.

Another advantage of the present invention is providing a grommet assembly having a nut and washer pre-assembled together for subsequent simultaneous installation.

Still another advantage of the present invention is providing a grommet that is inexpensive to manufacture, easy to assembly and install with a washer and fastener and that is durable in use.

Other features and advantages of the invention will become apparent to those skilled in the art upon review of the following detailed description, claims and drawings in which like numerals are used to designate like features.

Figure 1:
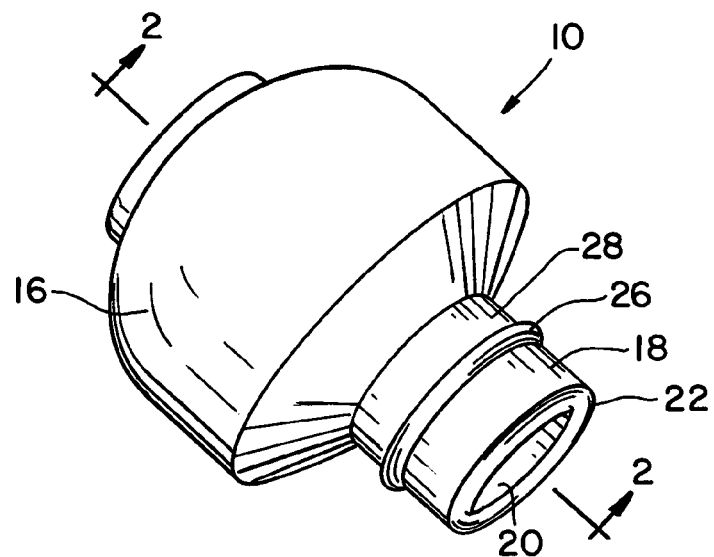
FIG. 1 is a perspective view of a grommet in accordance with the present invention.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use herein of "including", "comprising" and variations thereof is meant to encompass the items listed thereafter and equivalents thereof, as well as additional items and equivalents thereof.

DETAILED DESCRIPTION OF THE PREFERRED EMBODIMENT

Referring now more specifically to the drawings and to FIG. 1 in particular, numeral 10 designates a grommet in accordance with the present invention. Grommet 10 is operatively associated with a washer 12 and a fastener 14 in the nature of a nut 14. As will be described in further detail hereinafter, grommet 10 can be used in a variety of different configurations with washers and/or fasteners, such as nuts.

Grommet 10 also can be configured for use in a variety of applications in automobiles and other devices. Accordingly, those skilled in the art will understand readily that the general overall configuration, proportionate size and other features of grommet 10 can vary as required for the particular application in which it is used.

Grommet 10 is a compliant, elastomeric body of natural rubber, synthetic rubber and the like. The present invention for grommet 10 can be used with any suitable grommet material, with the features of the present invention, to be described hereinafter, formed as grommet 10 is cast, molded or otherwise shaped. Thus, the present invention can be used with known grommet materials suitable for the application and use to which grommet 10 will be put.

Grommet 10 includes an enlarged, bulbous body 16 and a cylindrical extension 18 therefrom. Body 16 and extension 18 together define an axial opening 20 through grommet 10. Grommet 10 therefore can be applied to a rod, arm, fastener or other elongated structure extending through axial opening 20.

Cylindrical extension 18 projects outwardly from one end of bulbous body 16 and defines a distal end 22 of extension 18 opposite the end joined with bulbous body 16. Distal end 22 is configured on its internal portion of axial opening 20 within cylindrical extension 18 to define an internal configuration 24 for securing a fastener 14, such as the depicted nut 14, at least partially within axial opening 20. In the exemplary embodiment, internal configuration 24 is an internally projecting annular rib 24 disposed substantially at the external entrance to axial opening 20, at distal end 22. However, those skilled in the art should readily understand that internal configuration 24 in the nature of an annular rib 24 can be positioned inwardly of the outermost edge of axial opening 20.

On the external surface thereof, cylindrical extension 18 defines an outward projection 26. In the exemplary embodiment, outward projection 26 is a circumferential rib 26 extending completely around cylindrical extension 18. Outward projection 26 in the nature of circumferential rib 26 is spaced axially along cylindrical extension 18 to be in spaced relationship with bulbous body 16. Accordingly, a washer retention zone 28 is defined between outward projection 26 and bulbous body 16.

Figure 2:
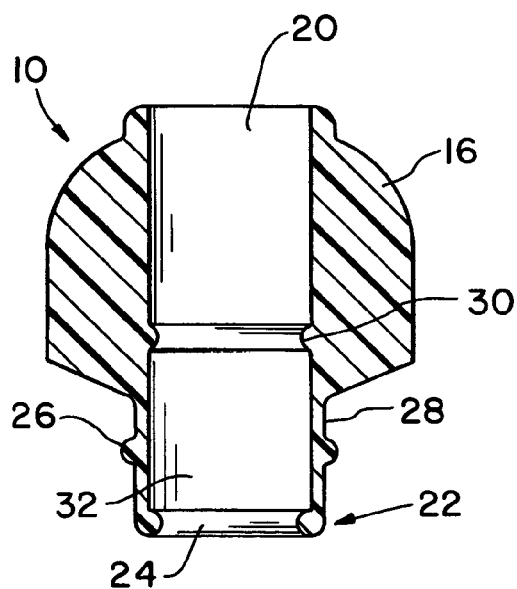
FIG. 2 is a cross-sectional view of the grommet shown in FIG. 1, taken along line 2-2 of FIG. 1.
Figure 3:
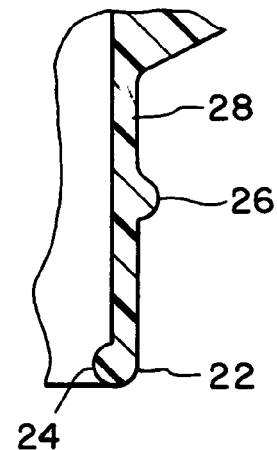
FIG. 3 is an enlarged view of a portion of the grommet shown in FIGS. 1 and 2.

In the exemplary embodiment shown in FIG. 2, axial opening 20 through bulbous body 16 and cylindrical extension 18 further defines an inward stop 30 in the nature of an inwardly projecting annular ring 30 spaced from internal configuration 24. Thus, grommet 10 can engage a component (not shown) inserted through axial opening 20 abutting or frictionally engaging stop 30, and a fastener retention zone 32 is provided within axial opening 20, between internal configuration 24 and stop 30.

As thus far described and shown, internal configuration 24, outward projection 26 and stop 30 are substantially continuous, ring-like structures extending completely around cylindrical extension 18 or within axial opening 20. However, those skilled in the art should readily understand that a plurality of discontinuous inward or outward projections can be used, or even a single projection can be used for one or more of internal configuration 24, outward projection 26 and stop 30. Rather than discrete formations on the surfaces of grommet 10, internal configuration 24, outward projection 26 and stop 30 can be provided in the way of changes in diameter to perform the retaining functions as will be described more fully hereinafter.

Figure 4:
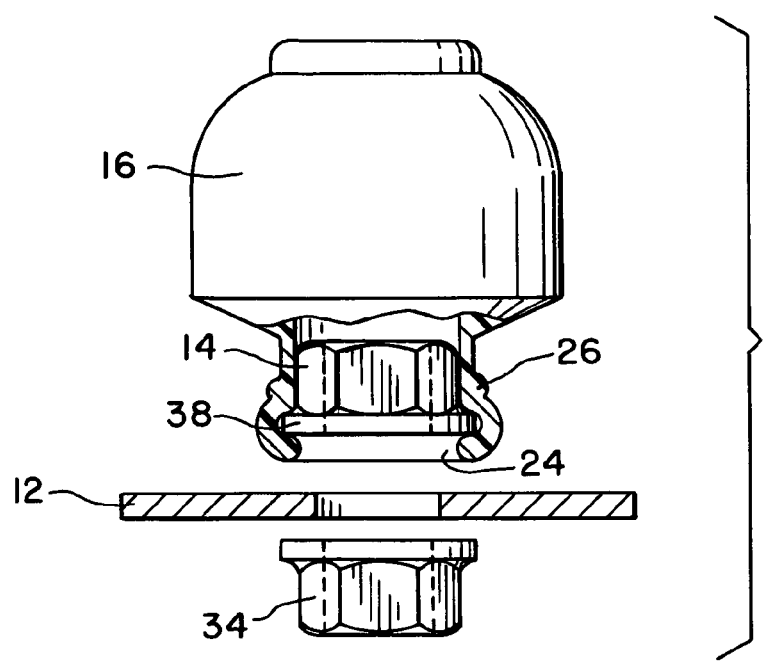
FIG. 4 is an exploded view of one configuration for use of the grommet of the present invention.

One application and use of grommet 10 is shown in FIG. 4 where a nut 14 is inserted fully within cylindrical extension 18. Washer 12 is disposed at distal end 22 and a second nut or other fastener 34 can then be engaged with a threaded member (not shown) engaging both nut 34 and nut 14.

Figure 5:
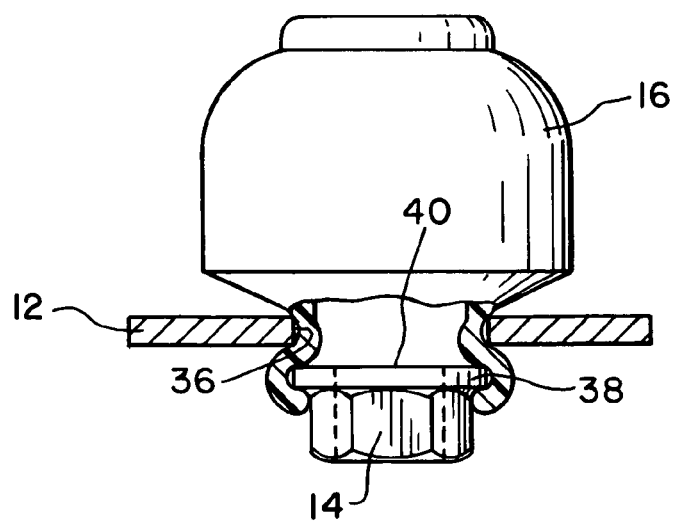
FIG. 5 is a perspective view, in partial cross-section, illustrating an assembly in accordance with the present invention, which includes a grommet, a washer and a nut.

FIG. 5 illustrates an advantageous application of the present invention in which both washer 12 and nut 14 are pre-assembled with and retained by grommet 10. An outside diameter of cylindrical extension 18 is selected to fit snugly within a central opening 36 of washer 12. Cylindrical extension 18 can be collapsed partly or otherwise deformed to be inserted into central opening 36 of washer 12, and moved therethrough until washer 12 is moved past outward projection 26. Washer 12 is thus retained within washer retention zone 28, generally between bulbous body 16 and outward projection 26.

Nut 14 is provided with a radially outwardly projecting flange 38 of slightly greater diameter than a selected internal diameter of cylindrical extension 18. Flange 38 of nut 14 is inserted into axial opening 20 of cylindrical extension 18 at distal end 22, and is positioned just inwardly of internal configuration 24. Stop 30 prevents nut 14 from moving too deeply into axial opening 20. As shown in FIG. 5, a portion of nut 14 projects outwardly of cylindrical extension 18, and can be engaged by a wrench or other implement for tightening nut 14 on a threaded device (not shown) extending through axial opening 20.

Flange 38 can be provided with a sharpened or other cutting edge 40 for severing the grommet material from between washer 12 and nut 14, thereby allowing for a solid connection of nut 14 against washer 12.

Thus, as illustrated in FIG. 5, grommet 10 can be pre-assembled with washer 12 and nut 14 so as to secure each to grommet 10 for transport and assembly. Installation in an automobile subassembly on a production line is facilitated in that three components can be pre-assembled and thereafter installed in one simple motion. It should be understood that grommet 10 need not be assembled with both washer 12 and nut 14, but instead also can be assembled with only washer 12 or only nut 14.

It should be understood that the features of the present invention also can be provided by insert molding cylindrical extension 18 through or around washer 12 and/or nut 14, thereby capturing washer 12 and/or nut 14.

Figure 6:
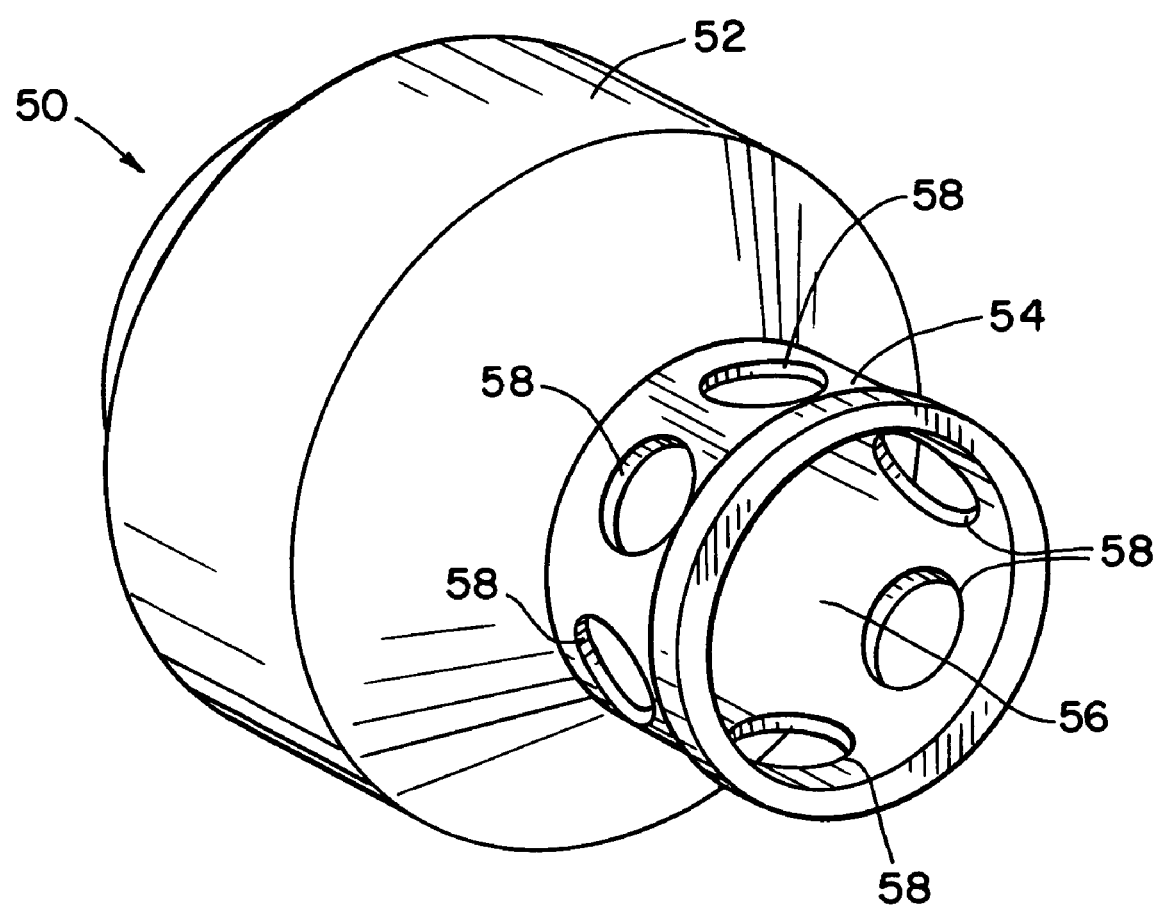
FIG. 6 is a perspective view of another embodiment of a grommet in accordance with the present invention.

FIG. 6 illustrates another embodiment of a grommet 50 in accordance with the present invention. Grommet 50 includes an enlarged, bulbous body 52 similar to body 16 described previously, and a cylindrical extension 54 therefrom similar to extension 18 described previously. Body 52 and extension 54 together define an axial opening 56 through grommet 50. Extension 54 defines one or more holes 58 therein, six such holes 58 being shown in the exemplary embodiment of FIG. 6. Holes 58 provide improved flexibility of extension 54, to facilitate assembly with a washer 12 and/or fastener 14 and improved retention of washer 12 and/or fastener 14.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A fastener assembly comprising: a grommet being made of a complaint, elastomeric material and including:
    a grommet body;
    a cylindrical extention projecting from said grommet body;
    an opening extending completely through said body and said extension, such that said grommet is adapted to receive an elongated member extending though said opening; and
    an outward projection on said extension in spaced relation with said body, defining a washer retention zone between said body and said projection;
    a washer positioned on said extension within said washer retention zone; and
    a fastener, wherein said extension has a distal end and an internal configuration at said distal end for retaining said fastener at least partly within said cylindrical extension, and wherein said fastener is configured for severing material of said cylindrical extension.

2. The fastener assembly of claim 1, said opening having an inwardly projecting stop in spaced relation with said internal configuration.

3. The fastener assembly of claim 1, said outward projection being a circumferential rib.

4. The fastener assembly of claim 1, said internal configuration comprising an annular rib.

5. The fastener assembly of claim 4, said outward projection being a circumferential rib.

6. The fastener assembly of claim 1, said extension having a hole therein.

7. The fastener assembly of claim 1, wherein said grommet body is a bulbous body and said cylindrical extension has axially aligned openings therethough, and wherein said outward projection is an outwardly projecting rib on said cylindrical extension in spaced relation with said bulbous body, said grommet further including an internal projection within said opening in said cylindrical extension near an end of said cylindrical extension opposite said bulbous body.

8. The fastener assembly of claim 7, said outward projection comprising a circumferential rib on said cylindrical extension.

9. The fastener assembly of claim 7, said internal projection comprising an annular rib within opening in said cylindrical extension.

10. The fastener assembly of claim 7, said axially aligned openings defining a stop therein in spaced relation to said internal projection.

11. The fastener assembly of claim 10, said outward projection being a circumferential rib, said internal projection being an annular rib and said stop being an annular ring.

12. The fastener assembly of claim 7, said extension having at least one hole therein.

13. A fastener assembly comprising:
    a grommet having a body and a cylindrical extension defining an axial opening extending completely therethrough so that said grommet is adapted to receive an elongated member extending through said opening;
    a washer disposed on said extension; and
    a fastener held at least partly within said cylindrical extension;
    wherein said cylindrical extension has a external rib, and said washer is retained on said cylindrical extension between said external rib and said body;
    said cylindrical extension has a distal end opposite said body and an annular rib within said axial opening at said distal end;
    said fastener is a nut having a flange held within said axial opening inwardly from said annular rib; and
    wherein said flange is configured for severing material of said cylindrical extension.

14. The fastener assembly of claim 13, said cylindrical extension having at least one hole therein.

15. A fastener assembly comprising:
    a grommet having a body and a cylindrical extension defining an axial opening extending completely therethrough so that said grommet is adapted to receive an elongated member extending through said opening;
    a washer disposed on said extension; and
    a fastener held at least partly within said cylindrical extension;
    wherein said cylindrical extension has a external rib, and said washer is retained on said cylindrical extension between said external rib and said body;
    said cylindrical extension has a distal end opposite said body and an annular rib within said axial opening at said distal end;
    said fastener is a nut having a flange held within said axial opening inwardly from said annular rib; and
    wherein said axial opening has an inwardly projecting stop in spaced relation with said annular rib, and said flange of said fastener being disposed within said axial opening between said stop and said annular rib.

* * * * *